(12) United States Patent
Li et al.

(10) Patent No.: US 12,451,509 B2
(45) Date of Patent: Oct. 21, 2025

(54) CUTTING-OFF APPARATUS AND BATTERY ASSEMBLY LINE PRODUCTION EQUIPMENT

(71) Applicant: JIANGSU CONTEMPORARY AMPEREX TECHNOLOGY LIMITED, Changzhou (CN)

(72) Inventors: Chen Li, Changzhou (CN); Pengkai Ji, Changzhou (CN); Yonglei Wang, Changzhou (CN); Shang Gao, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/976,349

(22) Filed: Dec. 11, 2024

(65) Prior Publication Data

US 2025/0105330 A1    Mar. 27, 2025

Related U.S. Application Data

(63) Continuation of application No. PCT/CN2023/102573, filed on Jun. 27, 2023.

(30) Foreign Application Priority Data

Sep. 23, 2022 (CN) .......................... 202222532508.9

(51) Int. Cl.
*H01M 10/04* (2006.01)
*B26D 7/10* (2006.01)
*B65H 18/16* (2006.01)

(52) U.S. Cl.
CPC .......... *H01M 10/0404* (2013.01); *B26D 7/10* (2013.01); *B65H 18/16* (2013.01); *B65H 2701/172* (2013.01); *B65H 2701/175* (2013.01)

(58) Field of Classification Search
CPC ............... H01M 10/0404; B65H 18/16; B65H 2701/175; B65H 2701/172; B26D 7/10
See application file for complete search history.

(56) References Cited

U.S. PATENT DOCUMENTS

| 5,159,865 A * | 11/1992 | Hinckley | ............... B26D 7/086 |
| | | | 83/16 |
| 9,385,395 B2 * | 7/2016 | Wu | ................... H01M 10/0436 |

(Continued)

FOREIGN PATENT DOCUMENTS

| CN | 103247826 B | * | 5/2015 | |
| CN | 108023110 A | * | 5/2018 | ........ H01M 10/0409 |

(Continued)

OTHER PUBLICATIONS

The international search report received in the counterpart international application PCT/CN2023/102573, mailed on Sep. 21, 2023.

(Continued)

*Primary Examiner* — Adam J Eiseman
*Assistant Examiner* — Fernando A Ayala
(74) *Attorney, Agent, or Firm* — K&L Gates LLP

(57) ABSTRACT

This application relates to the field of battery production equipment technologies, and in particular, to a cutting-off apparatus and battery assembly line production equipment. The cutting-off apparatus at least includes a slitting mechanism and a supporting element. With the provision of a supporting element connected to the slitting mechanism, the supporting element can provide a supporting force acting on a target electrode plate when the slitting mechanism in a cutting-off position is cutting off the separator. Then, when the separator rebounds due to being cut off and impacts the target electrode plate, the target electrode plate can avoid skewness due to the rebound of the separator under the support of the supporting element, thereby alleviating the problem of wrinkles of the electrode plate caused by the (Continued)

separator being cut off during winding of an electrode stack and reducing the risk of defects inside the battery.

16 Claims, 5 Drawing Sheets

(56) References Cited

U.S. PATENT DOCUMENTS

| | | | |
|---|---|---|---|
| 2011/0104567 A1* | 5/2011 | Lee | H01M 10/125 429/211 |
| 2013/0111739 A1* | 5/2013 | Wu | H01M 10/052 29/730 |
| 2014/0338824 A1* | 11/2014 | Takagi | B29D 99/005 156/237 |
| 2014/0342225 A1* | 11/2014 | Isshiki | H01M 4/366 429/217 |
| 2016/0285066 A1* | 9/2016 | Sakaguchi | H01M 10/0525 |
| 2020/0185753 A1* | 6/2020 | Kwon | H01M 10/0404 |
| 2023/0048342 A1* | 2/2023 | Ikeshita | H01M 50/469 |
| 2023/0158697 A1* | 5/2023 | Kim | H01M 10/04 29/730 |
| 2023/0411669 A1* | 12/2023 | Lim | H01M 10/0413 |
| 2024/0170707 A1* | 5/2024 | Bayat | B60L 50/64 |

FOREIGN PATENT DOCUMENTS

| | | | | |
|---|---|---|---|---|
| CN | 108736071 A | | 11/2018 | |
| CN | 110197885 A | * | 9/2019 | B26D 1/065 |
| CN | 113241480 A | | 8/2021 | |
| CN | 216120434 U | | 3/2022 | |
| CN | 216376824 U | | 4/2022 | |
| CN | 216505536 U | | 5/2022 | |
| CN | 115000529 A | | 9/2022 | |
| CN | 218827338 U | | 4/2023 | |
| JP | H11265726 A | * | 9/1999 | H01M 10/40 |
| JP | 2012033421 A | | 2/2012 | |
| WO | WO-2008093133 A2 | * | 8/2008 | B21C 47/26 |
| WO | WO-2016103754 A1 | * | 6/2016 | B26D 1/02 |

OTHER PUBLICATIONS

The Written Opinion of ISA received in the counterpart international application PCT/CN2023/102573, mailed on Sep. 21, 2023.
Notification to Grant Patent Right received in the counterpart Chinese application 202222532508.9, mailed on Jan. 11, 2023.

* cited by examiner

CUTTING-OFF APPARATUS AND BATTERY ASSEMBLY LINE PRODUCTION EQUIPMENT

CROSS-REFERENCE TO RELATED APPLICATIONS

This application is a continuation of International Application PCT/CN2023/102573, filed on Jun. 27, 2023, which claims priority to Chinese Patent Application No. 202222532508.9, filed on Sep. 23, 2022 and entitled "CUTTING-OFF APPARATUS AND BATTERY ASSEMBLY LINE PRODUCTION EQUIPMENT", which is incorporated herein by reference in its entirety.

TECHNICAL FIELD

This application relates to the field of battery production equipment technologies, and in particular, to a cutting-off apparatus and battery assembly line production equipment.

BACKGROUND

During winding of an electrode stack, a separator needs to be cut off. During this process, the problem of wrinkles of an electrode plate is prone to occurring.

SUMMARY

In view of this, embodiments of this application provide a cutting-off apparatus and battery assembly line production equipment, so as to alleviate the problem of wrinkles of an electrode plate caused by the separator being cut off during winding of an electrode stack.

According to a first aspect, this application provides a cutting-off apparatus for electrode stack. The electrode stack includes a first electrode plate, a second electrode plate, and a separator for separating the first electrode plate and the second electrode plate. The cutting-off apparatus includes a slitting mechanism configured to cut off the separator and a supporting element connected to the slitting mechanism. The slitting mechanism is in a cutting-off position, and the supporting element is capable of providing a supporting force to a target electrode plate. The target electrode plate is an electrode plate of the first electrode plate and the second electrode plate, located on the inner side of materials ready to be wound before feeding and winding start.

In the technical solution of this embodiment of this application, with the provision of a supporting element connected to the slitting mechanism, the supporting element can provide a supporting force acting on a target electrode plate when the slitting mechanism in a cutting-off position is cutting off the separator. Then, when the separator rebounds due to being cut off and impacts the target electrode plate, the target electrode plate can avoid skewness due to the rebound of the separator under the support of the supporting element, thereby alleviating the problem of wrinkles of the electrode plate caused by the separator being cut off during winding of an electrode stack and reducing the risk of defects inside the battery.

In some embodiments, the slitting mechanism is in a cutting-off position, and the supporting element is capable of providing a supporting force to a feeding head end of the target electrode plate. The provision of the supporting force to the feeding head end of the target electrode plate can allow the supporting force of the supporting element to act on the feeding head end of the target electrode plate, which can better avoid the occurrence of skewness of the target electrode plate during feeding.

In some embodiments, the supporting element includes a supporting surface configured to support the target electrode plate; and the supporting surface being constructed to be capable of supporting at least part of the target electrode plate in a breadth direction of the target electrode plate. With the supporting surface being configured to support the target electrode plate in the breadth direction of the target electrode plate, the supporting area of the supporting element supporting the target electrode plate can be increased, making the supporting element more effective in supporting the target electrode plate.

In some embodiments, a dimension of the supporting surface in the breadth direction is greater than or equal to a breadth of the target electrode plate. Thus, the target electrode plate can be supported by the supporting surface in the breadth direction, further achieving effective support for the target electrode plate by the supporting element.

In some embodiments, the supporting surface is configured as a plane. The supporting surface configured as a plane can further increase the contact area between the supporting surface and the target electrode plate, and can be adapted to a shape of the target electrode plate, enabling a more stable support for the target electrode plate.

In some embodiments, a surface roughness of the supporting surface is less than 5 micrometers. Thus, with limitation on the surface roughness of the supporting surface, the frictional force generated between the supporting element and the target electrode plate can be reduced when the target electrode plate is fed, preventing the supporting element from damaging the target electrode plate.

In some embodiments, the slitting mechanism includes a slitting element configured to cut off the separator in the cutting-off position and a driving apparatus drivingly connected to the slitting element. The driving apparatus is configured to drive the slitting element to move to the cutting-off position. The supporting element is connected to the slitting element. Because the slitting mechanism includes the slitting element and the driving apparatus, and the supporting element is connected to the slitting element, when the driving apparatus drives the slitting element to move to the cutting-off position, the supporting element can be driven by the slitting element and moved to a position close to the cutting-off position. In this way, the target electrode plate can be supported by the supporting element in a region near the cutting-off position, further improving the stability of feeding the target electrode plate.

In some embodiments, the cutting-off apparatus further includes a first adjusting apparatus. The first adjusting apparatus is connected between the supporting element and the slitting element and configured to adjust a position of the supporting element relative to the target electrode plate in the breadth direction of the target electrode plate. Thus, with the provision of the first adjusting apparatus, the supporting element can be adjusted in the breadth direction of the target electrode plate.

In some embodiments, the first adjusting apparatus includes a first mounting element and a fixing element. The first mounting element is connected to the supporting element, and the first mounting element is detachably connected to the slitting mechanism through use of the fixing element. Thus, the first mounting element is detachably connected to the slitting mechanism, facilitating adjustment of the position of the first mounting element relative to the slitting mechanism and in turn adjustment of the position of the supporting element connected to the first mounting element.

In some embodiments, the cutting-off apparatus further includes a second adjusting apparatus. The second adjusting apparatus is connected between the supporting element and the first adjusting apparatus to enable the supporting element to rotate around an axis, where the axis and the breadth direction of the target electrode plate are parallel to each other. The provision of the second adjusting apparatus facilitates adjustment of the angle of the supporting element relative to the target electrode plate.

In some embodiments, the second adjusting apparatus includes: a second mounting element connected to the first adjusting apparatus; a rotatable connector, where the supporting element is rotatably connected to the second mounting element around the axis through use of the rotatable connector; and a fixing connector detachably connected between the second mounting element and the supporting element. The provision of the rotatable connector enables the supporting element to be rotatably connected to the second mounting element around the axis. In addition, with the provision of the detachable fixing connector, when the supporting element turns a desired angle relative to the second mounting element, the supporting element that has turned the desired angle can be fixed through use of the fixing connector.

In some embodiments, the second mounting element is provided with a guide hole; and the fixing connector includes an insertion element and a fastening element; where one end of the insertion element is connected to the supporting element, the other end is inserted into the guide hole, and the fastening element is detachably connected to the other end of the insertion element to position the other end of the insertion element in the guide hole; where the guide hole is configured as an arc-shaped hole, and the arc center of the guide hole is located on the axis. Due to the fact that the arc center of the guide hole is located on the axis, when the supporting element rotates around the axis relative to the second mounting element, the insertion element connected to the supporting element can fit with the guide hole and be fixed by the fastening element.

In some embodiments, the slitting element includes a resistive hot knife or an electric wire hot knife. Thus, a resistive hot knife or an electric wire hot knife can be selected to cut off the separator by using the heat generated by the hot knife.

According to a second aspect, this application provides battery assembly line production equipment, including: a winding start mandrel and a roll-up mandrel sequentially arranged along a feeding direction of a separator; and the cutting-off apparatus in the foregoing embodiments. The slitting mechanism is configured to cut off the separator located between the winding start mandrel and the roll-up mandrel; and the target electrode plate is an electrode plate of the first electrode plate and the second electrode plate, located on the inner side of materials ready to be wound before being fed to the winding start mandrel, the inner side of materials ready to be wound being a side closer to the winding start mandrel. Thus, the slitting mechanism is used to cut off the separator located between the winding start mandrel and the roll-up mandrel, and concurrently, the supporting element is used to support the target electrode plate fed to the winding start mandrel and closer to the winding start mandrel, so that the target electrode plate can be fed more smoothly to the winding start mandrel, thereby alleviating the problem of wrinkles of the electrode plate caused by the separator being cut off during winding of an electrode stack and reducing the risk of defects inside the battery.

In some embodiments, the slitting mechanism is in the cutting-off position, and a preset clearance is provided between the supporting element and the winding start mandrel along a direction in which the supporting element supports the target electrode plate. The positional relationship set between the supporting element and the slitting mechanism enables a preset clearance to be provided between the supporting element and the winding start mandrel when the slitting mechanism is in the cutting-off position. Thus, the position of the supporting element can be set according to an actual use situation to meet the support of the supporting element for the target electrode plate.

In some embodiments, the battery assembly line production equipment further includes a first rolling element connected to the slitting mechanism and a second rolling element arranged between the winding start mandrel and the roll-up mandrel. When the slitting mechanism is in the cutting-off position, the first rolling element, in conjunction with the second rolling element, is capable of forming a confined space, the confined space being used to restrict the separator located between the winding start mandrel and the roll-up mandrel. Thus, the separator located between the winding start mandrel and the roll-up mandrel can be restricted through use of the first rolling element and the second rolling element, preventing the roll-up mandrel from being damaged when the separator is cut off.

In some embodiments, the battery assembly line production equipment further includes a first elastic element connected between the first rolling element and the slitting mechanism. When the slitting mechanism is in the cutting-off position, the first rolling element is capable of pressing tightly against the separator by the elastic force of the first elastic element. Thus, with the provision of the first elastic element, a process of the first rolling element pressing tightly against the separator located at the roll-up mandrel becomes more flexible, reducing the damage to the separator located at the roll-up mandrel.

In some embodiments, both the first rolling element and the second rolling element are provided in plurality, all the second rolling elements are spaced apart along the feeding direction of the separator, and all the first rolling elements correspond one-to-one with all the second rolling elements. Thus, the provision of a plurality of first rolling elements and second rolling elements facilitates to restrict the separator located between the winding start mandrel and the roll-up mandrel, further preventing the roll-up mandrel from being damaged when the separator is cut off.

In some embodiments, a surface of the first rolling element and/or the second rolling element is provided with an elastic layer. With the provision of the elastic layer on the surface of the first rolling element and/or the second rolling element, the elasticity of the elastic layer can be used to prevent the separator from being damaged when the rolling element presses tightly against the separator.

In some embodiments, a diameter of the first rolling element and/or the second rolling element is 5 millimeters to 40 millimeters. Thus, based on the size of the electrode stack wound on the roll-up mandrel, the diameter of the first rolling element and/or the second rolling element can be correspondingly set, so that the separator located between the winding start mandrel and the roll-up mandrel can be better restricted.

In the technical solution of this embodiment of this application, the supporting element can provide a supporting force acting on a target electrode plate when the slitting mechanism in a cutting-off position is cutting off the separator. Then, the target electrode plate can avoid skewness due to the rebound of the separator under the support of the supporting element, thereby alleviating the problem of wrinkles of the electrode plate caused by the separator being cut off during winding of an electrode stack and reducing the risk of defects inside the battery.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific implementations of this application.

BRIEF DESCRIPTION OF DRAWINGS

Other advantages and benefits will become apparent to those of ordinary skill in the art by reading the following detailed descriptions of exemplary implementations. The accompanying drawings are merely intended to illustrate the purposes of the exemplary implementations, and should not be construed as a limitation on this application. In addition, in all the accompanying drawings, same parts are denoted by same reference signs. In the accompanying drawings.

Other advantages and benefits will become apparent to those of ordinary skill in the art by reading the following detailed descriptions of exemplary implementations. The accompanying drawings are merely intended to illustrate the purposes of the exemplary implementations, and should not be construed as a limitation on this application. In addition, in all the accompanying drawings, same parts are denoted by same reference signs. In the accompanying drawings.

DESCRIPTION OF EMBODIMENTS

Figure 1:
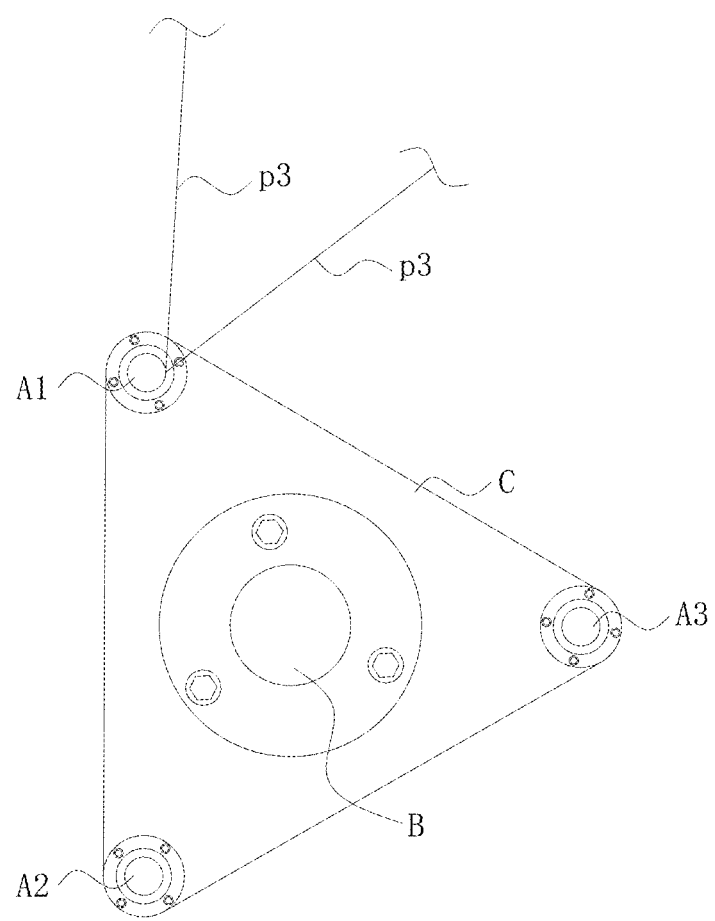
FIG. 1 is a schematic structural diagram of a mandrel assembly in a first state according to some embodiments in the related art.

The following describes in detail embodiments of technical solutions of this application with reference to the accompanying drawings. The following embodiments are merely intended for a clearer description of the technical solutions of this application and therefore are used as just examples that do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", "have", and any other variations thereof in the specification, claims and brief description of drawings of this application are intended to cover non-exclusive inclusions.

In the description of the embodiments of this application, the technical terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the descriptions of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise specified and defined explicitly, the terms "mounting", "connection", "join", and "fastening" should be understood in their general senses. For example, they may refer to a fixed connection, a detachable connection, or an integral connection, may refer to a mechanical connection or electrical connection, and may refer to a direct connection, an indirect connection via an intermediate medium, an internal communication between two components, or an interactive relationship between two components. Persons of ordinary skill in the art can understand specific meanings of these terms in the embodiments of this application as suitable to specific situations.

Currently, from a perspective of market development, application of power batteries is being more extensive. Power batteries have been not only used in energy storage power supply systems such as hydroelectric power plants, heat power plants, wind power plants, and solar power plants, but also widely used in many other fields including electric transportation tools such as electric bicycles, electric motorcycles, and electric vehicles, military equipment, and aerospace. With the continuous expansion of application fields of power batteries, market demands for the power batteries are also expanding.

Figure 2:
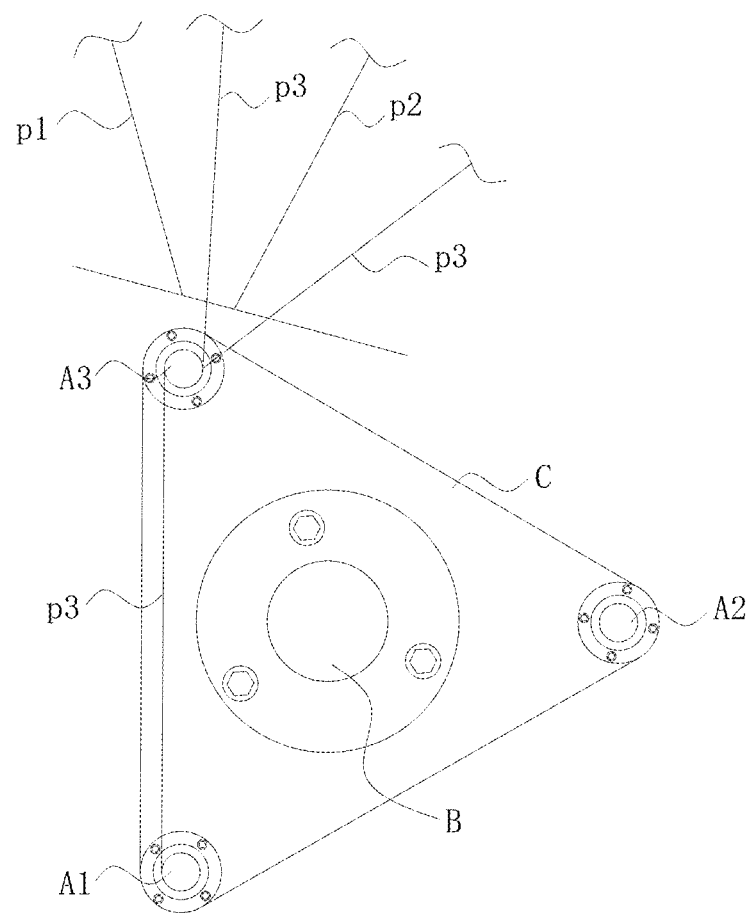
FIG. 2 is a schematic structural diagram of a mandrel assembly in a second state according to some embodiments in the related art.

Referring to FIG. 1 and FIG. 2, FIG. 1 is a schematic structural diagram of a mandrel assembly in a first state according to some embodiments in the related art; and FIG. 2 is a schematic structural diagram of a mandrel assembly in a second state according to some embodiments in the related art. The mandrel assembly is used during winding of an electrode stack. The mandrel assembly includes a first mandrel A1, a second mandrel A2, a third mandrel A3, and a rotating element B for driving the first mandrel A1, the second mandrel A2, and the third mandrel A3 to flip. Specifically, the rotating element B is provided with a connecting base plate C, and the first mandrel A1, the second mandrel A2, and the third mandrel A3 are arranged on the connecting base plate C around the rotating element B. The first mandrel A1, the second mandrel A2, and the third mandrel A3 are rotatably connected to the connecting base plate C, respectively. As shown in FIG. 1, when the mandrel assembly is in the first state, the first mandrel A1 is located in a first position and in a winding state, the second mandrel A2 is located in a second position and in a roll-up completed state, and the third mandrel A3 is located in a third position and in a state of discharging an electrode stack. As shown in FIG. 2, the mandrel assembly is in the second state, that is, after completing the winding by the first mandrel A1, the roll-up by the second mandrel A2, and the discharging by the third mandrel A3, the rotating element B drives the first mandrel A1 to flip from the first position to the second position, the second mandrel A2 to flip from the second position to the third position, and the third mandrel A3 to flip from the third position to the first position. In this case, the first mandrel A1 located in the second position is in a ready for roll-up state, the second mandrel A2 located in the second position is in a ready for discharging state, and the third mandrel A3 located in the first position is in a state of not starting to wind. In this case, it is necessary to cut off the separator p3 located between the first mandrel A1 and the third mandrel A3 to complete the roll-up by the first mandrel A1. The cycle is repeated in this way to achieve a continuous winding process for electrode assemblies.

The inventors of this application have noticed that, as shown in FIG. 2, two separators are wound onto the third mandrel A3 before the first electrode plate p1 and the second electrode plate p2. The two separators are sequentially wound onto the third mandrel A3 and the second mandrel A2 along the feeding direction. The separator p3 is in a tensioned state. Therefore, when the separator p3 is cut off, the release of the tension on the separator p3 causes the third mandrel A3 to reverse, resulting in the rebound or flanging of the separator p3. In this case, during the process of feeding the first electrode plate p1 and the second electrode plate p2 to the third mandrel A3 located in the first position, the first electrode plate p1 located on the inner side (that is, closer to the third mandrel A3) may be skewed due to the impact of the rebounding separator p3, which then affects the feeding of the first electrode plate p1 and is likely to cause the problem of generation of wrinkles on the electrode plate, resulting in defects inside the battery and posing safety hazards. It can be understood that the first electrode plate p1 is a positive electrode plate, the second electrode plate p2 is a negative electrode plate, or the first electrode plate p1 is a negative electrode plate, and the second electrode plate p2 is a positive electrode plate.

In order to avoid skewness of the electrode plate caused by the impact of the rebounding separator p3 during feeding, the inventors of this application have found through research that a supporting force acting on the impacted electrode plate can be provided to prevent the impacted electrode plate from being skewed during feeding due to the aforementioned impact. Specifically, a supporting element 200 that can move together with the slitting mechanism 100 can be used, and the supporting element 200 can support the electrode plate that will be impacted by the separator p3 when the slitting mechanism 100 cuts off the separator p3. Thus, the feeding process of the electrode plate can be more stable, thereby alleviating the wrinkles of the electrode plate generated during winding of an electrode stack.

Based on the above considerations, in order to alleviate the problem of wrinkles of an electrode plate generated during winding of an electrode stack, through in-depth research, the inventors of this application have designed a slitting mechanism including a supporting element that can support the electrode plate while a separator is being cut.

The battery mentioned in the embodiments of this application is a single physical module that includes one or more battery cells for providing higher voltage and capacity. For example, the battery mentioned in this application may include a battery module, a battery pack, or the like. A battery typically includes a box for packaging one or more battery cells. The box can prevent liquids or other foreign matter from affecting charging or discharging of the battery cells.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in embodiments of this application. The battery cell may be cylindrical, flat, cuboid, or of other shapes. This is not limited in the embodiments of this application either. Battery cells may include cylindrical cells and prismatic cells depending on the packaging method. This is not limited in the embodiments of this application either.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive electrode tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. A negative electrode current collector uncoated with the negative electrode active substance layer protrudes out of a negative electrode current collector coated with the negative electrode active substance layer and serves as a negative electrode tab. The negative electrode current collector may be made of copper, and the negative electrode active substance may be carbon, silicon, or the like. To allow a high current to pass through without any fusing, a plurality of positive electrode tabs are provided and stacked together, and a plurality of negative electrode tabs are provided and stacked together. The separator may be configured as a separation film, and the separation film may be made of PP (polypropylene), PE (polyethylene), or a ceramic with a PVDF (polyvinylidene fluoride) coating. It should be noted that the electrode assembly in the embodiments of this application is composed of a wound electrode stack. The wound electrode stack disclosed in the embodiments of this application can be but is not limited to a cylindrical shape, a flat shape, or other shapes.

The cutting-off apparatus disclosed in the embodiments of this application can be but is not limited to being used in the mandrel assembly shown in the related art above, and can also be but is not limited to being used in the production process of electrode stacks. The production equipment having the cutting-off apparatus disclosed in this application can be used on the battery production line, so that generation of wrinkles of the electrode plate is alleviated, making it easier to manufacture batteries with superior safety performance.

Figure 3:
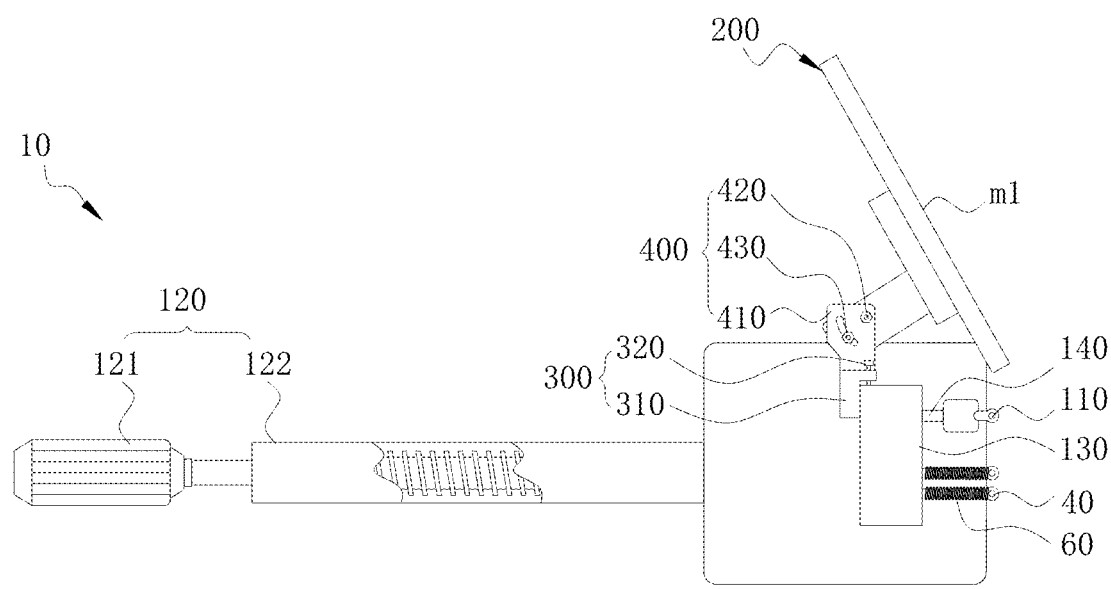
FIG. 3 is a schematic structural diagram of a cutting-off apparatus from one perspective according to some embodiments of this application.
Figure 4:
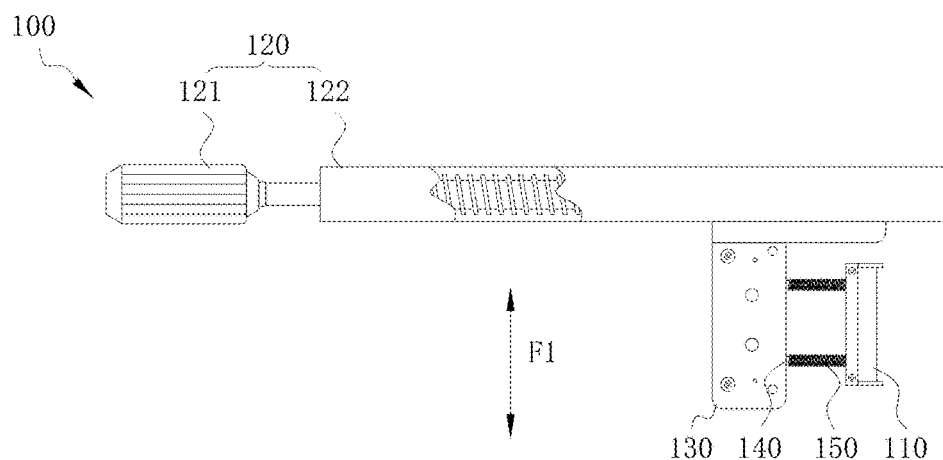
FIG. 4 is a schematic structural diagram of a slitting mechanism from another perspective according to some embodiments of this application.

According to some embodiments of this application, referring to FIG. 3 and FIG. 4, FIG. 3 is a schematic structural diagram of a cutting-off apparatus 10 from one perspective according to some embodiments of this application; and FIG. 4 is a schematic structural diagram of a slitting mechanism 100 from another perspective according to some embodiments of this application. It should be noted that the perspective in FIG. 3 is a front view, and the perspective in FIG. 4 is a top view. FIG. 3 schematically shows a first rolling element 40 and a first elastic element 60 shown later herein. Details about the illustrations schematically shown later are not provided here.

This application provides a cutting-off apparatus 10 for electrode stack. The electrode stack includes a first electrode plate p1, a second electrode plate p2, and a separator p3 configured to separate the first electrode plate p1 from the second electrode plate p2. The cutting-off apparatus 10 includes a slitting mechanism 100 and a supporting element 200. The slitting mechanism 100 is configured to cut off the separator p3, and the supporting element 200 is connected to the slitting mechanism 100. The slitting mechanism 100 is in a cutting-off position, and the supporting element 200 is capable of providing a supporting force to a target electrode plate p0. The target electrode plate p0 is an electrode plate of the first electrode plate p1 and the second electrode plate p2, located on the inner side of materials ready to be wound before feeding and winding start.

The first electrode plate p1 and the second electrode plate p2 are the positive electrode plate and the negative electrode plate constituting the electrode stack. The first electrode plate p1 may be the positive electrode plate, and the second electrode plate p2 may be the negative electrode plate, or the first electrode plate p1 is the negative electrode plate, and the second electrode plate p2 is the positive electrode plate.

The separator p3 is a member configured to separate the first electrode plate p1 from the second electrode plate p2. The separator p3 may be in the form of the foregoing separation film, and details are not repeated herein.

The slitting mechanism 100 is a mechanism for cutting off the separator p3. In other words, the slitting mechanism 100 can cut off the separator p3 and divide it into different parts. The slitting mechanism 100 can be a mechanism that provides a slitting force to the separator p3 to cut the separator p3 into different parts, or a mechanism that can fuse the separator p3 into different parts, or other types of mechanisms. Selection can be made according to an actual use situation, and this is not specifically limited in the embodiments of this application.

The supporting element 200 is a member that can provide support to the target electrode plate p0. Since the supporting element 200 is connected to the slitting mechanism 100, the supporting element 200 moves under the drive of the slitting mechanism 100. When the slitting mechanism 100 is in the cutting-off position, the supporting element 200 also moves to a position where it can support the target electrode plate p0, and in this case, the supporting element 200 can provide a supporting force to the target electrode plate p0.

Figure 5:
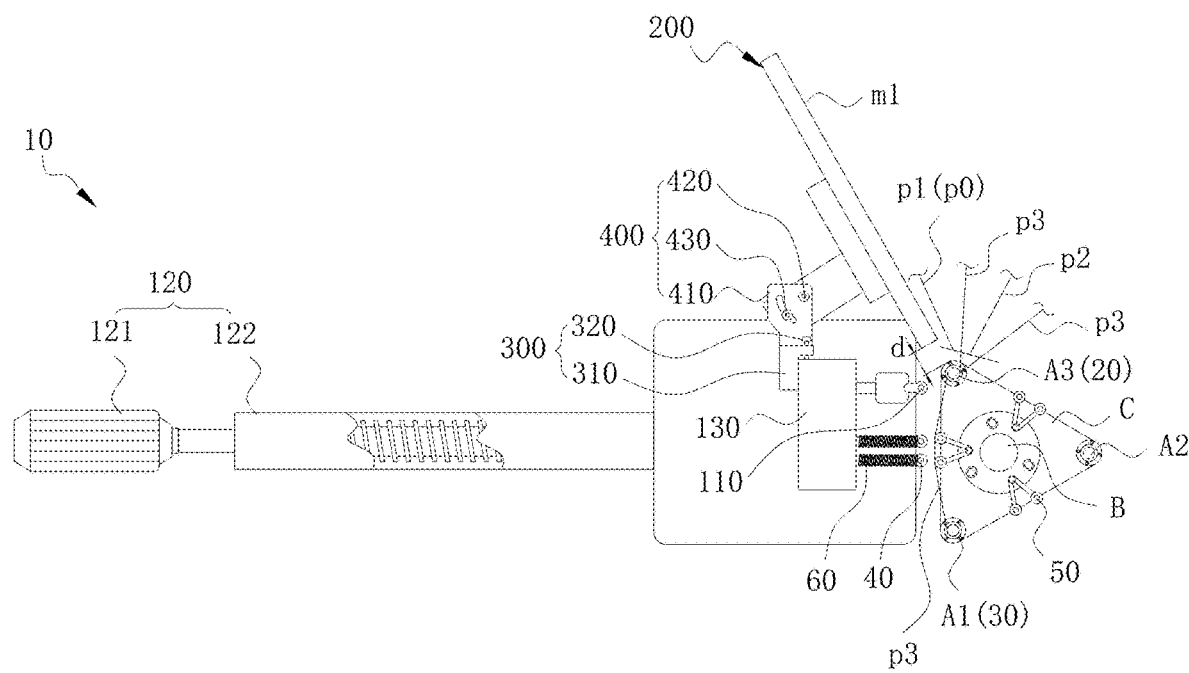
FIG. 5 is a schematic structural diagram of a cutting-off apparatus fitting with a mandrel assembly according to some embodiments of this application.

The target electrode plate p0 is the foregoing impacted electrode plate, that is, the electrode plate of the first electrode plate p1 and the second electrode plate p2, located on the inner side of materials ready to be wound before feeding and winding start. Taking the foregoing mandrel assembly as an example, and referring to FIG. 5, FIG. 5 is a schematic structural diagram of the cutting-off apparatus 10 fitting with a mandrel assembly according to some embodiments of this application. Before feeding and winding start refers to a procedure in which the third mandrel A3 in the mandrel assembly is in a ready to be wound state and the first electrode plate p1 and the second electrode plate p2 have not been fed to the third mandrel A3. The electrode plate located on the inner side of materials ready to be wound refers to an electrode plate on a side of the first electrode plate p1 and the second electrode plate p2 closer to the third mandrel A3 before feeding to the third mandrel A3. FIG. 5 schematically shows a situation in which the first electrode plate p1 is closer to the third mandrel A3, that is, the first electrode plate p1 is the target electrode plate p0. After the first electrode plate p1 and the second electrode plate p2 are fed to the third mandrel A3, for the first electrode plate p1 of the first loop and the second electrode plate p2 of the first loop, the first electrode plate p1 of the first loop is closer to the third mandrel A3 than the second electrode plate p2 of the first loop.

Continuing with FIG. 5 as an example, when the slitting mechanism 100 is in the cutting-off position, the supporting element 200 can support the first electrode plate p1 on the feeding path of the first electrode plate p1. When the separator p3 between the first mandrel A1 and the third mandrel A3 is cut off, the release of the tension on the separator p3 causes the third mandrel A3 to reverse, and the separator p3 being fed to the third mandrel A3 rebounds or flanges. In this case, the first electrode plate p1 closer to the third mandrel A3 is impacted by the rebounding or flanging separator p3. Under the action of the supporting element 200, the first electrode plate p1 can avoid skewness, so that the first electrode plate p1 can be fed to the third mandrel A3 in a more stable manner.

In this way, with the provision of a supporting element 200 connected to the slitting mechanism 100, the supporting element 200 can provide a supporting force acting on a target electrode plate p0 when the slitting mechanism 100 in a cutting-off position is cutting off the separator p3. Then, when the separator p3 rebounds due to being cut off and impacts the target electrode plate p0, the target electrode plate p0 can avoid skewness due to the rebound or flip of the separator p3 under the support of the supporting element 200, thereby alleviating the problem of wrinkles of the electrode plate caused by the separator p3 being cut off during winding of an electrode stack and reducing the risk of defects inside the battery.

According to some embodiments of this application, continuing to refer to FIG. 3 and FIG. 5, when the slitting mechanism 100 is in the cutting-off position, the supporting element 200 can provide a supporting force to the feeding head end of the target electrode plate p0.

The inventors of this application have further noticed that the impact of the separator p3 on the target electrode plate p0 is greater in a position closer to the feeding head end of the target electrode plate p0. Taking FIG. 5 as an example, the feeding head end of the first electrode plate p1 is the end closer to the third mandrel A3, so the separator p3 experiences a greater impact by the first electrode plate p1 on its feeding head end and is more likely to skew. Thus, the provision of the supporting force to the feeding head end of the target electrode plate p0 can allow the supporting force of the supporting element 200 to act on the feeding head end of the target electrode plate p0, which can better avoid the occurrence of skewness of the target electrode plate p0 during feeding.

Figure 6:
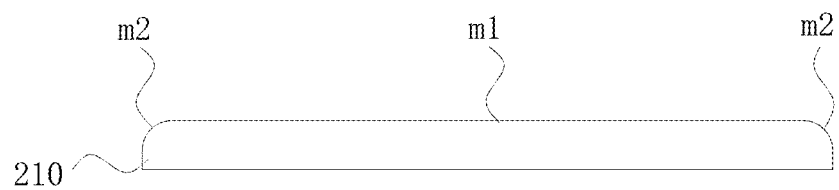
FIG. 6 is a schematic structural diagram of a supporting element from one perspective according to some embodiments of this application.

According to some embodiments of this application, referring to FIG. 6 and with reference to FIG. 3 and FIG. 5, FIG. 6 is a schematic structural diagram of the supporting element 200 from one perspective according to some embodiments of this application. The supporting element 200 includes a supporting surface m1 configured to support the target electrode plate p0. The supporting surface m1 is configured to support at least part of the target electrode plate p0 in the breadth direction F1 of the target electrode plate p0. For example, the supporting element 200 may include a supporting body 210. The supporting body 210 can be configured as a plate-shaped structure, and the supporting surface m1 is formed on one surface of the supporting body 210. Taking FIG. 5 as an example, the supporting element 200 supports the first electrode plate p1 through use of the supporting surface m1.

Thus, with the supporting surface m1 being configured to support the target electrode plate p0 in the breadth direction F1 of the target electrode plate p0, the supporting area of the supporting element 200 supporting the target electrode plate p0 can be increased, making the supporting element 200 more effective in supporting the target electrode plate p0. Furthermore, since the target electrode plate p0 is supported through surface contact, feeding of the target electrode plate p0 can be guided; and in addition, the target electrode plate p0 can be smoothed before feeding. That is, the stability of the feeding of the target electrode plate p0 can be further improved, avoiding quality problems such as flipping and wrinkling of the target electrode plate p0.

Figure 7:
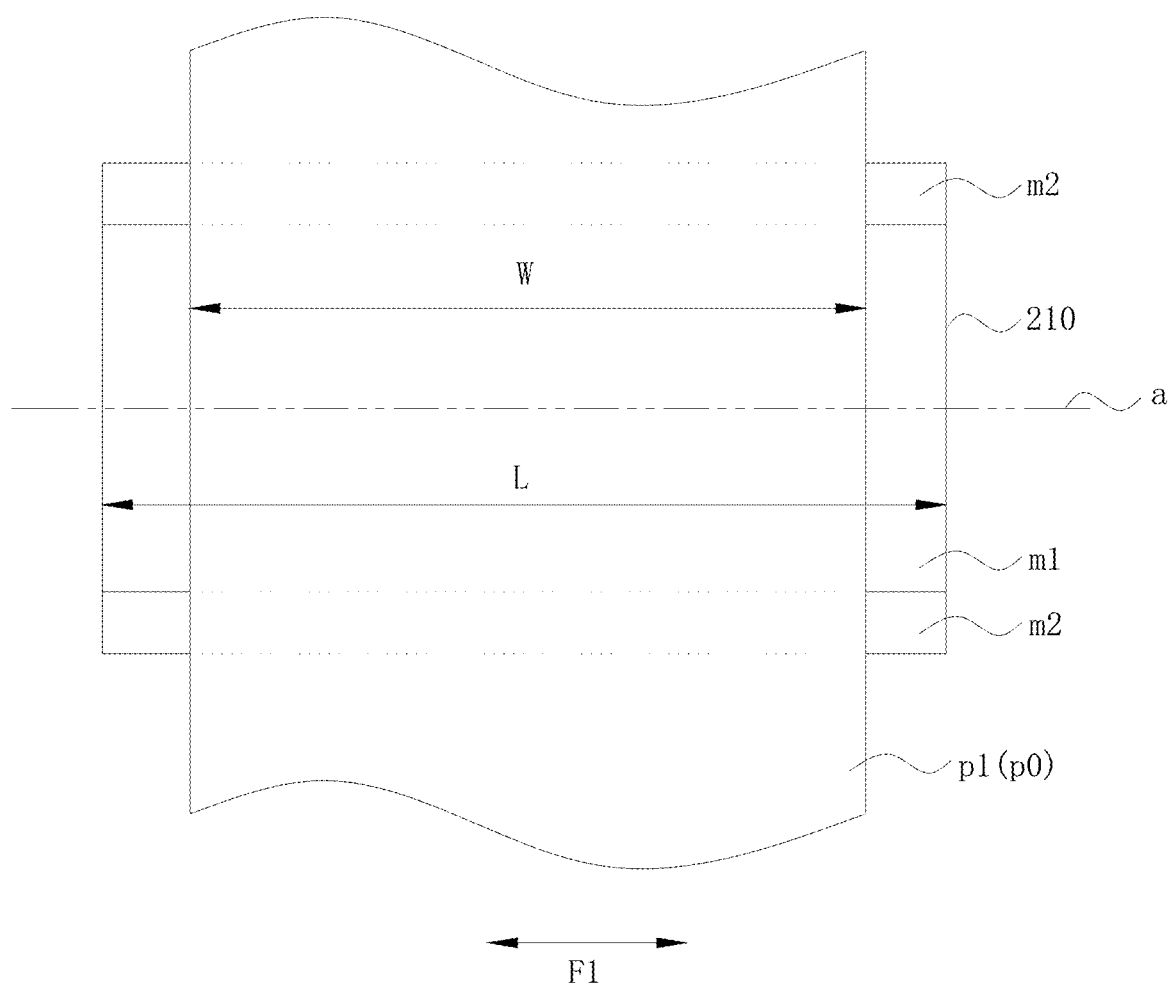
FIG. 7 is a schematic structural diagram of a supporting element fitting with a target electrode plate from another perspective according to some embodiments of this application.

According to some embodiments of this application, referring to FIG. 7 and with reference to FIG. 3, FIG. 5, and FIG. 6, FIG. 7 is a schematic structural diagram of the supporting element 200 fitting with the target electrode plate p0 from another perspective according to some embodiments of this application. A dimension L of the supporting surface m1 in the breadth direction F1 is greater than or equal to a breadth W of the target electrode plate p0.

Thus, the target electrode plate p0 can be supported by the supporting surface m1 in the breadth direction F1, further achieving effective support for the target electrode plate p0 by the supporting element 200.

According to some embodiments of this application, continuing to refer to FIG. 7 and with reference to FIG. 3, FIG. 5, and FIG. 6, the supporting surface m1 is configured as a plane.

The supporting surface m1 configured as a plane can further increase the contact area between the supporting surface m1 and the target electrode plate p0, and can be adapted to a shape of the target electrode plate p0, enabling a more stable support for the target electrode plate p0.

According to some embodiments of this application, continuing to refer to FIG. 7 and with reference to FIG. 3, FIG. 5, and FIG. 6, the surface roughness of the supporting surface m1 is less than 5 micrometers.

Thus, with limitation on the surface roughness of the supporting surface m1, the frictional force generated between the supporting element 200 and the target electrode plate p0 can be reduced when the target electrode plate p0 is fed, preventing the supporting element 200 from damaging the target electrode plate p0.

According to some embodiments of this application, continuing to refer to FIG. 6 and FIG. 7 and with reference to FIG. 3 and FIG. 5, the supporting element 200 further includes auxiliary surfaces m2 connected to the supporting surface m1. The auxiliary surfaces m2 can be arranged on two sides of the supporting surface m1 along the feeding direction of the target electrode plate p0. Specifically, the auxiliary surfaces m2 are inclined relative to the supporting surface m1, and the auxiliary surfaces m2 are configured as curved surfaces and smoothly connected to the supporting surface m1.

Thus, when the supporting surface m1 supports the target electrode plate p0, the auxiliary surfaces m2 provided can help the feeding of the target electrode plate p0, further reducing the frictional force generated between the supporting element 200 and the target electrode plate p0, thereby alleviating the damage caused by the supporting element 200 to the target electrode plate p0.

According to some embodiments of this application, continuing to refer to FIG. 3 to FIG. 5, the slitting mechanism 100 includes a slitting element 110 and a driving apparatus 120. The slitting element 110 is configured to cut off the separator p3 in a cutting position. The driving apparatus 120 is drivingly connected to the slitting element 110 and configured to drive the slitting element 110 to move to the cutting-off position. The supporting element 200 is connected to the slitting element 110.

Because the slitting mechanism 100 includes the slitting element 110 and the driving apparatus 120, and the supporting element 200 is connected to the slitting element 110, when the driving apparatus 120 drives the slitting element 110 to move to the cutting-off position, the supporting element 200 can be driven by the slitting element 110 and moved to a position close to the cutting-off position. In other words, the supporting element 200 can move together with the slitting element 110 under the drive of the driving apparatus 120. Taking FIG. 5 as an example, when the slitting element 110 moves to the cutting-off position, a region near the slitting element 110 is confined. In the confined space, the supporting element 200 is directly connected to the slitting element 110, and a power mechanism used to drive the supporting element 200 separately can be omitted, thereby avoiding the difficulty in using the supporting element 200 in the region near the cutting-off position due to space restriction. In this way, the target electrode plate p0 can be supported by the supporting element 200 in a region near the cutting-off position, further improving the stability of feeding the target electrode plate p0.

According to some embodiments of this application, continuing to refer to FIG. 3 to FIG. 5, the driving apparatus 120 includes a driving motor 121 and a transmission element 122. The output end of the driving motor 121 is drivingly connected to one end of the transmission element 122, and the other end of the transmission element 122 is drivingly connected to the slitting element 110. Of course, driving apparatuses such as linear cylinders, for example, can also be used, as long as they can drive the slitting element 110 to move to the cutting-off position, and this is not specifically limited in the embodiments of this application.

Thus, the structural form of the driving apparatus 120 can be flexibly set according to an actual use situation, as long as it can meet the usage requirements.

According to some embodiments of this application, continuing to refer to FIG. 3 to FIG. 5, the slitting mechanism 100 further includes a third mounting element 130, a rod element 140, and a second elastic element 150. The third mounting element 130 is connected to a drive end of the driving apparatus 120 (that is, the other end of the transmission element 122 in some foregoing embodiments). The second elastic element 150 is connected between the slitting element 110 and the third mounting element 130, and the rod element 140 is inserted into the second elastic element 150 and fixed onto the third mounting element 130.

The provision of the second elastic element 150 can make the process of the slitting element 110 cutting off the separator more flexible, and the rod element 140 can be used to guide the expansion and contraction of the second elastic element 150, so that the slitting element 110 is more stable during operation.

According to some embodiments of this application, continuing to refer to FIG. 3 to FIG. 5, the cutting-off apparatus 10 further includes a first adjusting apparatus 300. The first adjusting apparatus 300 is connected between the supporting element 200 and the slitting element 110 and configured to adjust a position of the supporting element 200 relative to the target electrode plate p0 in the breadth direction F1 of the target electrode plate p0.

Thus, the provision of the first adjusting apparatus 300 allows the supporting element 200 to be adjusted in the breadth direction F1 of the target electrode plate p0. In other words, for target electrode plates p0 of different sizes and in different positions, the position of the supporting element 200 can also be adjusted by the first adjusting apparatus 300, which can also improve the versatility of the apparatus in use.

According to some embodiments of this application, continuing to refer to FIG. 3 and FIG. 5, the first adjusting apparatus 300 includes a first mounting element 310 and a fixing element 320. The first mounting element 310 is connected to the supporting element 200, and the first mounting element 310 is detachably connected to the slitting mechanism 100 through use of the fixing element 320. For example, the first mounting element 310 can be mounted on the third mounting element 130 in some foregoing embodiments. In an implementation, the first mounting element 310 can be configured to be slidably connected with the third mounting element 130 along the breadth direction F1 as shown in FIG. 4, and the first mounting element 310 is then fixed to the third mounting element 130 through the fixing element 320. In another implementation, positioning holes spaced apart along the breadth direction F1 can be provided on the third mounting element 130, and the fixing element 320 can be matched with the positioning holes to fix the first mounting element 310 to the third mounting element 130. For example, the fixing element 320 may be a bolt assembly. Of course, other embodiments may also be adopted, as long as the first adjusting apparatus 300 can adjust the position of the supporting element 200 in the breadth direction F1, and this is not specifically limited in the embodiments of this application.

Thus, the first mounting element 310 is detachably connected to the slitting mechanism 100, facilitating adjustment of the position of the first mounting element 310 relative to the slitting mechanism 100 and in turn adjustment of the position of the supporting element 200 connected to the first mounting element 310.

Figure 8:
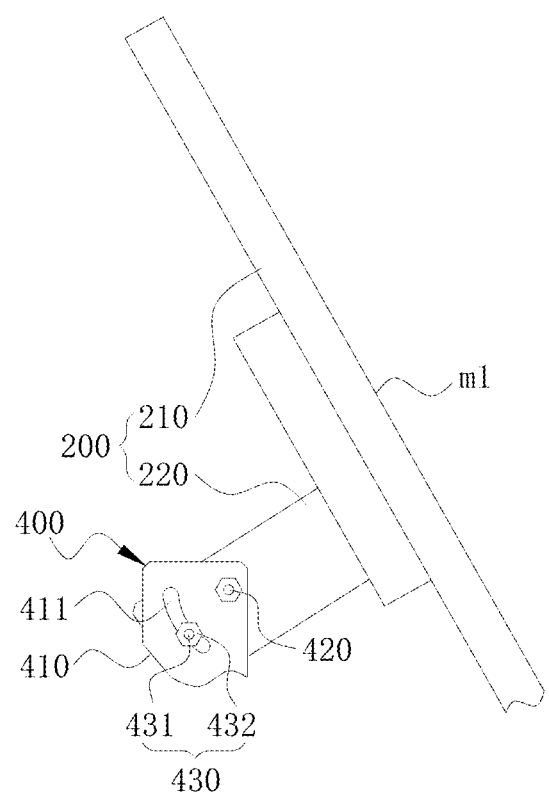
FIG. 8 is a schematic structural diagram of a supporting element fitting with a second adjusting apparatus according to some embodiments of this application.

According to some embodiments of this application, referring to FIG. 8 and with reference to FIG. 3 and FIG. 5, FIG. 8 is a schematic structural diagram of the supporting element 200 fitting with a second adjusting apparatus 400 according to some embodiments of this application, and the cutting-off apparatus 10 further includes the second adjusting apparatus 400. The second adjusting apparatus 400 is connected between the supporting element 200 and the first adjusting apparatus 300 to enable the supporting element 200 to rotate around an axis a. The axis a and the breadth direction F1 of the target electrode plate p0 are parallel to each other. For example, the second adjusting apparatus 400 may be provided on the first mounting element 310 in some foregoing embodiments.

Thus, the provision of the second adjusting apparatus 400 facilitates adjustment of the angle of the supporting element 200 relative to the target electrode plate p0.

According to some embodiments of this application, continuing to refer to FIG. 8 and with reference to FIG. 3 and FIG. 5, the second adjusting apparatus 400 includes a second mounting element 410, a rotatable connector 420, and a fixing connector 430. The second mounting element 410 is connected to the first adjusting apparatus 300. The supporting element 200 is rotatably connected to the second mounting element 410 around the axis a through use of the rotatable connector 420. The fixing connector 430 is detachably connected between the second mounting element 410 and the supporting element 200. For example, as shown in FIG. 5 and FIG. 8, in specific implementations, the second mounting element 410 may be connected to the first mounting element 310 in some foregoing embodiments. The supporting element 200 may be configured to include the supporting body 210 mentioned in some foregoing embodiments and a fourth mounting element 220 connected to the supporting body 210, and the fourth mounting element 220 is rotatably connected to the second mounting element 410 around the axis a through use of the rotatable connector 420.

The provision of the rotatable connector 420 enables the supporting element 200 to be rotatably connected to the second mounting element 410 around the axis a. In addition, with the provision of the detachable fixing connector 430, when the supporting element 200 turns a desired angle relative to the second mounting element 410, the supporting element 200 that has turned the desired angle can be fixed through use of the fixing connector 430.

According to some embodiments of this application, continuing to refer to FIG. 8 and with reference to FIG. 3 and FIG. 5, the second mounting element 410 is provided with a guide hole 411. The fixing connector 430 includes an insertion element 431 and a fastening element 432. One end of the insertion element 431 is connected to the supporting element 200, and the other end is inserted into the guide hole 411. The fastening element 432 is detachably connected to the other end of the insertion element 431 to position the other end of the insertion element 431 in the guide hole 411. The guide hole 411 is configured as an arc-shaped hole, and the arc center of the guide hole 411 is located on the axis a. For example, the insertion element 431 may be configured as a screw structure, and the fastening element 432 may be configured as a nut structure fitting with the insertion element 431. A scale line may be provided around the guide hole 411 on the second mounting element 410 to indicate an angle of adjustment.

Due to the fact that the arc center of the guide hole 411 is located on the axis a, when the supporting element 200 rotates around the axis a relative to the second mounting element 410, the insertion element 431 connected to the supporting element 200 can fit with the guide hole 411 and be fixed by the fastening element 432.

According to some embodiments of this application, continuing to refer to FIG. 3 to FIG. 5, the slitting element 110 includes a resistive hot knife or an electric wire hot knife.

Thus, a resistive hot knife or an electric wire hot knife can be selected to cut off the separator p3 by using the heat generated by the hot knife.

According to some embodiments of this application, the slitting element 110 can be provided as a resistive hot knife, and when the slitting element 110 is in the cutting-off position, the slitting element 110 are configured with slitting parameters: a power supply voltage of 220V and a power-on time of 0.03 seconds to 3.5 seconds, so that the temperature of the resistance wire in the slitting element is controlled at 110° C. to 380° C.

Thus, the slitting element 110 is energized within a short period of time from a time when it approaches the separator p3 to a time when the separator p3 is fused, so the power supply time is short, which makes the slitting element 110 heat up quickly and cool fast after power off. This improves safety performance and enables faster cutting off of the separator p3. In addition, the temperature of the resistive wire can be appropriately adjusted according to the material and structure of the separator p3, and this is not specifically limited in the embodiments of this application.

According to a second aspect, this application provides battery assembly line production equipment, including: a winding start mandrel 20, a roll-up mandrel 30, and the cutting-off apparatus 10 in the foregoing embodiments. The winding start mandrel 20 and the roll-up mandrel 30 are sequentially arranged along a feeding direction of the separator p3. The slitting mechanism 100 is configured to cut off the separator p3 located between the winding start mandrel 20 and the roll-up mandrel 30. The target electrode plate p0 is an electrode plate of a first electrode plate p1 and a second electrode plate p2, located on the inner side of materials ready to be wound before being fed to the winding start mandrel 20, the inner side of materials ready to be wound being a side closer to the winding start mandrel 20. Taking FIG. 5 as an example, referring to the content schematically shown in some foregoing embodiments, the third mandrel A3 is the winding start mandrel 20, the first mandrel A1 is the roll-up mandrel 30, and the target electrode plate p0 is the first electrode plate p1, which is also applicable later in the specification, and details will not be repeated.

Thus, the slitting mechanism 100 is used to cut off the separator p3 located between the winding start mandrel 20 and the roll-up mandrel 30, and concurrently, the supporting element 200 is used to support the target electrode plate p0 fed to the winding start mandrel 20 and closer to the winding start mandrel 20, so that the target electrode plate p0 can be fed more smoothly to the winding start mandrel 20, thereby alleviating the problem of wrinkles of the electrode plate caused by the separator p3 being cut off during winding of an electrode stack and reducing the risk of defects inside the battery.

According to some embodiments of this application, continuing to refer to FIG. 5, the slitting mechanism 100 is in the cutting-off position, and a preset clearance d is provided between the supporting element 200 and the winding start mandrel 20 (that is, the third mandrel A3 schematically shown in FIG. 5) along a direction in which the supporting element 200 supports the target electrode plate p0. For example, the preset clearance d may be set to less than 2 millimeters. For example, the preset clearance d may be 0.5 millimeters, 0.7 millimeters, 0.9 millimeters, 1 millimeter, 1.2 millimeters, 1.8 millimeters, or the like. The preset clearance d can be set according to an actual use situation, and this is not specifically limited in the embodiments of this application.

Because the rebound or flip caused by the separator p3 is more serious at a region closer to the winding start mandrel 20, a positional relationship is set between the supporting element 200 and the slitting mechanism 100, so that the position of the supporting element 200 can be set according to an actual use situation, to meet the support of the supporting element 200 for the target electrode plate p0. In other words, a preset clearance d can be provided between the supporting element 200 and the winding start mandrel 20 when the slitting mechanism 100 is in the cutting-off position.

According to some embodiments of this application, continuing to refer to FIG. 5, the battery assembly line production equipment further includes a first rolling element 40 and a second rolling element 50. The first rolling element 40 is connected to the slitting mechanism 100, and the second rolling element 50 is arranged between the winding start mandrel 20 and the roll-up mandrel 30. The slitting mechanism 100 is in the cutting-off position, and the first rolling element 40, in conjunction with the second rolling element 50, is capable of forming a confined space, the confined space being used to restrict the separator p3 located between the winding start mandrel 20 and the roll-up mandrel 30.

In other words, based on the content schematically shown in some foregoing embodiments, taking FIG. 5 as an example, the first rolling element 40 can be connected to the third mounting element 130, and the second rolling element 50 can be connected to a rotating element B through use of a mounting structure. When the rotating element B drives the first mandrel A1, the second mandrel A2, and the third mandrel A3 to rotate, the second rolling element 50 also follows the rotation. It can be understood that the second rolling element 50 is arranged between the first mandrel A1 and the second mandrel A2, between the first mandrel A1 and the third mandrel A3, and between the second mandrel A2 and the third mandrel A3, meeting the requirements for continuous production. The slitting mechanism 100 is in the cutting-off position, and the first rolling element 40, in conjunction with the corresponding of second rolling element 50, is capable forming a confined space. In other words, the first rolling element 40 presses the separator p3 tightly against a corresponding rolling element, so that the separator p3 between the first mandrel A1 and the second mandrel A2 is restricted in the formed confined space.

Thus, the separator p3 located between the winding start mandrel 20 and the roll-up mandrel 30 can be restricted through use of the first rolling element 40 and the second rolling element 50, preventing the roll-up mandrel 30 from being damaged when the separator p3 is cut off.

According to some embodiments of this application, continuing to refer to FIG. 3 and FIG. 5, the battery assembly line production equipment further includes a first elastic element 60. The first elastic element 60 is connected between the first rolling element 40 and the slitting mechanism 100. The slitting mechanism 100 is in the cutting-off position, and the first rolling element 40 is capable of pressing tightly against the separator p3 by the elastic force of the first elastic element 60.

In this way, with the provision of the first elastic element 60, a process of the first rolling element 40 pressing tightly against the separator p3 located at the roll-up mandrel 30 becomes more flexible, reducing the damage to the separator p3 located at the roll-up mandrel 30.

According to some embodiments of this application, continuing to refer to FIG. 3 and FIG. 5, both the first rolling element 40 and the second rolling element 50 are provided in plurality, all the second rolling elements 50 are spaced apart along the feeding direction of the separator p3, and all the first rolling elements 40 correspond one-to-one with all the second rolling elements 50. Taking FIG. 3 and FIG. 5 as an example, a case is illustrated in which two first rolling elements 40 are provided, and two second rolling elements 50 corresponding to the first rolling elements 40 (that is, the second rolling elements 50 located between the first mandrel A1 and the second mandrel A2 in this case) are provided. The provision can be made according to an actual use situation, and this is not specifically limited in the embodiments of this application.

The provision of a plurality of first rolling elements 40 and second rolling elements 50 facilitates to restrict the separator p3 located between the winding start mandrel 20 and the roll-up mandrel 30, further preventing the roll-up mandrel 30 from being damaged when the separator p3 is cut off.

According to some embodiments of this application, a surface of the first rolling element 40 and/or the second rolling element 50 is provided with an elastic layer. The elastic layer is a layered structure that can undergo elastic deformation and recover. The elastic layer may be made of rubber, sponge, or other elastic materials, and this is not specifically limited in the embodiments of this application.

With the provision of the elastic layer on the surface of the first rolling element 40 and/or the second rolling element 50, the elasticity of the elastic layer can be used to prevent the separator p3 from being damaged when the rolling element presses tightly against the separator p3.

According to some embodiments of this application, a diameter of the first rolling element 40 and/or the second rolling element 50 is 5 millimeters to 40 millimeters. For example, a diameter of the first rolling element 40 and/or the second rolling element 50 may be 5 millimeters, 7 millimeters, 10 millimeters, 15 millimeters, 20 millimeters, 25 millimeters, 30 millimeters, 35 millimeters, or 40 millimeters.

Thus, based on the size of the electrode stack wound on the roll-up mandrel 30, the diameter of the first rolling element 40 and/or the second rolling element 50 can be correspondingly set, so that the separator p3 located between the winding start mandrel 20 and the roll-up mandrel 30 can be better restricted.

In this way, with the first rolling element 40 provided on the cutting-off apparatus 10 in some foregoing embodiments and the second rolling element 50 provided on the mandrel assembly, and in combination with the structural forms and arrangement forms of the first rolling element 40 and the second rolling element 50, the part of the separator p3 connected with the roll-up mandrel 30 can be pressed tightly when the separator p3 is cut off, so that damage to the separator p3 can be prevented and the overall structure can be made more compact.

In summary, in the cutting-off apparatus 10 provided by this application, the supporting element 200 connected to the slitting mechanism 100, and the first adjusting apparatus 300 and the second adjusting apparatus 400 for adjusting the supporting element 200 are provided, so that the position of the supporting element 200 can be adjusted based on the position of the target electrode plate p0. The supporting element 200 can provide a supporting force acting on a target electrode plate p0 when the slitting mechanism 100 in a cutting-off position is cutting off the separator p3. Then, when the separator p3 rebounds due to being cut off and impacts the target electrode plate p0, the target electrode plate p0 can avoid skewness due to the rebound of the separator p3 under the support of the supporting element 200, thereby alleviating the problem of wrinkles of the electrode plate caused by the separator p3 being cut off during winding of an electrode stack and reducing the risk of defects inside the battery. Further, because the supporting element 200 is connected to the slitting element 110 of the slitting mechanism 100, it can extend into the region near the winding start mandrel 20 when the space is restricted, providing support to the feeding head end of the target electrode plate p0 and making the feeding of the target electrode plate p0 more precise. Furthermore, because the supporting element 200 can move along with the slitting element 110, the action process can be implemented with only one driving apparatus 120, further improving the production speed and reducing the manufacturing cost. Therefore, for the battery assembly line production equipment using the cutting-off apparatus 10, the battery assembly line production equipment can produce higher quality batteries.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the implementations can be combined in any manners. This application is not limited to the specific embodiments disclosed in this specification but includes all technical solutions falling within the scope of the claims.

What is claimed is:

1. A cutting-off apparatus for an electrode stack, the electrode stack comprising a first electrode plate, a second electrode plate, and a separator configured to separate the first electrode plate from the second electrode plate, wherein the cutting-off apparatus comprises:
   a slitting mechanism comprising a slitting element configured to be placed in a cutting-off position and cut off the separator;
   a supporting element connected to the slitting element and capable of providing a supporting force to a target electrode plate; wherein the target electrode plate is one of the first electrode plate and the second electrode plate, located on an inner side of the electrode stack ready to be wound before feeding and winding start;

a first adjusting apparatus connected between the supporting element and the slitting element and configured to adjust a position of the supporting element relative to the target electrode plate in a breadth direction of the target electrode plate; and a second adjusting apparatus connected between the supporting element and the first adjusting apparatus to enable the supporting element to rotate around an axis, wherein the axis and the breadth direction of the target electrode plate are parallel to each other.

2. The cutting-off apparatus according to claim 1, wherein the supporting element is capable of providing a supporting force to a feeding head end of the target electrode plate.

3. The cutting-off apparatus according to claim 1, wherein the supporting element comprises a supporting surface for supporting the target electrode plate; and the supporting surface is configured to be capable of supporting at least part of the target electrode plate in the breadth direction of the target electrode plate.

4. The cutting-off apparatus according to claim 3, wherein a dimension of the supporting surface in the breadth direction is greater than or equal to a breadth of the target electrode plate.

5. The cutting-off apparatus according to claim 3, wherein the supporting surface is configured as a plane.

6. The cutting-off apparatus according to claim 3, wherein a surface roughness of the supporting surface is less than 5 micrometers.

7. The cutting-off apparatus according to claim 1, wherein the slitting mechanism further comprises:

a driving apparatus, wherein the driving apparatus is drivingly connected to the slitting element and configured to drive the slitting element to move to the cutting-off position;

wherein the supporting element is connected to the slitting element.

8. The cutting-off apparatus according to claim 1, wherein the first adjusting apparatus comprises a first mounting element and a fixing element; wherein the first mounting element is connected to the supporting element, and the first mounting element is detachably connected to the slitting mechanism through use of the fixing element.

9. The cutting-off apparatus according to claim 1, wherein the second adjusting apparatus comprises:

a second mounting element, wherein the second mounting element is connected to the first adjusting apparatus;

a rotatable connector, wherein the supporting element is rotatably connected to the second mounting element around the axis through use of the rotatable connector; and a fixing connector, wherein the fixing connector is detachably connected between the second mounting element and the supporting element.

10. The cutting-off apparatus according to claim 9, wherein the second mounting element is provided with a guide hole; and the fixing connector comprises an insertion element and a fastening element, wherein one end of the insertion element is connected to the supporting element, the other end is inserted into the guide hole, and the fastening element is detachably connected to the other end of the insertion element to position the other end of the insertion element in the guide hole;

wherein the guide hole is configured as an arc-shaped hole, and the arc center of the guide hole is located on the axis.

11. The cutting-off apparatus according to claim 1, wherein the slitting element comprises a resistive hot knife or an electric wire hot knife.

12. A battery assembly line production equipment, comprising:

a cutting-off apparatus for an electrode stack, the electrode stack comprising a first electrode plate, a second electrode plate, and a separator configured to separate the first electrode plate from the second electrode plate; and a winding start mandrel and a roll-up mandrel, wherein the winding start mandrel and the roll-up mandrel are sequentially arranged along a feeding direction of the separator;

wherein the cutting-off apparatus comprises:

a slitting mechanism comprising a slitting element configured to be placed in a cutting-off position and cut off the separator located between the winding start mandrel and the roll-up mandrel; and a supporting element connected to the slitting element and is capable of providing a supporting force to a target electrode plate;

a first adjusting apparatus connected between the supporting element and the slitting element and configured to adjust a position of the supporting element relative to the target electrode plate in a breadth direction of the target electrode plate; and a second adjusting apparatus connected between the supporting element and the first adjusting apparatus to enable the supporting element to rotate around an axis, wherein the axis and the breadth direction of the target electrode plate are parallel to each other, wherein the target electrode plate is one of the first electrode plate and the second electrode plate, located on an inner side of the electrode stack ready to be wound before being fed to the winding start mandrel, the inner side of the electrode stack ready to be wound being a side closer to the winding start mandrel.

13. The battery assembly line production equipment according to claim 12, wherein when the slitting element is in the cutting-off position, and along a direction in which the supporting element supports the target electrode plate, a preset clearance is provided between the supporting element and the winding start mandrel.

14. The battery assembly line production equipment according to claim 12, wherein the battery assembly line production equipment further comprises a first rolling element connected to the slitting mechanism and a second rolling element arranged between the winding start mandrel and the roll-up mandrel; and when the slitting element is in the cutting-off position, and the first rolling element, in conjunction with the second rolling element, is capable of forming a confined space, the confined space being used to restrict the separator located between the winding start mandrel and the roll-up mandrel.

15. The battery assembly line production equipment according to claim 14, wherein the battery assembly line production equipment further comprises a first elastic element connected between the first rolling element and the slitting mechanism; and when the slitting element is in the cutting-off position, the first rolling element is capable of abutting against the separator by an elastic force of the first elastic element.

16. The battery assembly line production equipment according to claim 14, wherein both the first rolling element and the second rolling element are provided in plurality, all the second rolling elements are spaced apart along the feeding direction of the separator, and all the first rolling elements correspond one-to-one with all the second rolling elements; and/or
   a surface of the first rolling element and/or the second rolling element is provided with an elastic layer; and/or
   a diameter of the first rolling element and/or the second rolling element is 5 millimeters to 40 millimeters.

* * * * *